US009530432B2

(12) United States Patent
Herbig et al.

(10) Patent No.: US 9,530,432 B2
(45) Date of Patent: Dec. 27, 2016

(54) METHOD FOR DETERMINING THE PRESENCE OF A WANTED SIGNAL COMPONENT

(75) Inventors: Tobias Herbig, Ulm (DE); Franz Gerl, Neu-Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 2257 days.

(21) Appl. No.: 12/507,444

(22) Filed: Jul. 22, 2009

(65) Prior Publication Data

US 2010/0030558 A1 Feb. 4, 2010

(30) Foreign Application Priority Data

Jul. 22, 2008 (EP) ..................................... 08013196

(51) Int. Cl.
  *G10L 25/78* (2013.01)
  *G10L 15/22* (2006.01)

(52) U.S. Cl.
  CPC ............ *G10L 25/78* (2013.01); *G10L 15/222* (2013.01)

(58) Field of Classification Search
  USPC ................................................ 704/226, 233
  See application file for complete search history.

(56) References Cited

U.S. PATENT DOCUMENTS

| | | | |
|---|---|---|---|
| 4,015,088 A | 3/1977 | Dubnowski et al. | 179/1 SC |
| 4,052,568 A | 10/1977 | Jankowski | 179/15 AS |
| 4,057,690 A | 11/1977 | Vagliani et al. | 179/15 AS |
| 4,359,064 A | 11/1982 | Kimble | 179/1 SC |
| 4,410,763 A | 10/1983 | Strawczynski et al. | 364/513.5 |
| 4,672,669 A | 6/1987 | DesBlache et al. | 381/46 |
| 4,688,256 A | 8/1987 | Yasunaga | 381/46 |
| 4,764,966 A | 8/1988 | Einkauf et al. | 381/46 |
| 4,825,384 A | 4/1989 | Sakurai | 364/513.5 |
| 4,829,578 A | 5/1989 | Roberts | 381/46 |
| 4,864,608 A | 9/1989 | Miyamoto et al. | 379/409 |

(Continued)

FOREIGN PATENT DOCUMENTS

| | | |
|---|---|---|
| EP | 2 148 325 A1 | 7/2005 |
| EP | 2 107 553 A1 | 10/2009 |
| EP | 2 148 325 A1 | 1/2010 |

OTHER PUBLICATIONS

European Patent Office—Extended European Search Report; Application No. 08013196.4-2225;. Sep. 19, 2008.

(Continued)

*Primary Examiner* — Matthew Baker
(74) *Attorney, Agent, or Firm* — Daly, Crowley Mofford & Durkee, LLP

(57) ABSTRACT

This invention provides a method for determining, in a speech dialog system issuing speech prompts, a score value as an indicator for the presence of a wanted signal component in an input signal stemming from a microphone, comprising the steps of: using a first likelihood function to determine a first likelihood value for the presence of the wanted signal component in the input signal, using a second likelihood function to determine a second likelihood value for the presence of a noise signal component in the input signal, and determining a score value based on the first and the second likelihood values, wherein the first likelihood function is based on a predetermined reference wanted signal, and the second likelihood function is based on a predetermined reference noise signal.

28 Claims, 5 Drawing Sheets

(56) References Cited

U.S. PATENT DOCUMENTS

| | | | |
|---|---|---|---|
| 4,914,692 A | 4/1990 | Hartwell et al. | 379/410 |
| 5,048,080 A | 9/1991 | Bell et al. | 379/165 |
| 5,125,024 A | 6/1992 | Gokcen et al. | 379/88 |
| 5,155,760 A | 10/1992 | Johnson et al. | 379/67 |
| 5,220,595 A | 6/1993 | Uehara | 379/74 |
| 5,239,574 A | 8/1993 | Brandman et al. | 379/88 |
| 5,349,636 A | 9/1994 | Irribarren | 379/89 |
| 5,394,461 A | 2/1995 | Garland | 379/106 |
| 5,416,887 A | 5/1995 | Shimada | 395/2.42 |
| 5,434,916 A | 7/1995 | Hasegawa | 379/406 |
| 5,475,791 A | 12/1995 | Schalk et al. | 395/2.42 |
| 5,548,681 A * | 8/1996 | Gleaves et al. | 704/233 |
| 5,577,097 A | 11/1996 | Meek | 379/3 |
| 5,652,828 A | 7/1997 | Silverman | 395/2.69 |
| 5,708,704 A | 1/1998 | Fisher | 379/410 |
| 5,761,638 A | 6/1998 | Knittle et al. | 704/233 |
| 5,765,130 A | 6/1998 | Nguyen | 704/233 |
| 5,784,454 A | 7/1998 | Patrick et al. | 379/406 |
| 5,956,675 A | 9/1999 | Setlur et al. | 704/231 |
| 5,978,763 A | 11/1999 | Bridges | 704/233 |
| 6,018,711 A | 1/2000 | French-St. George et al. | 704/275 |
| 6,061,651 A | 5/2000 | Nguyen | 704/233 |
| 6,098,043 A | 8/2000 | Forest et al. | 704/270 |
| 6,246,986 B1 * | 6/2001 | Ammicht et al. | 704/270 |
| 6,266,398 B1 | 7/2001 | Nguyen | 379/88.01 |
| 6,279,017 B1 | 8/2001 | Walker | 707/529 |
| 6,336,091 B1 * | 1/2002 | Polikaitis et al. | 704/233 |
| 6,526,382 B1 | 2/2003 | Yuschik | 704/275 |
| 6,574,595 B1 * | 6/2003 | Mitchell et al. | 704/242 |
| 6,606,595 B1 * | 8/2003 | Chengalvarayan et al. | 704/256.5 |
| 6,647,363 B2 | 11/2003 | Claassen | 704/1 |
| 6,785,365 B2 | 8/2004 | Nguyen | 379/88.01 |
| 6,882,973 B1 * | 4/2005 | Pickering | G10L 15/222 379/88.02 |
| 7,062,440 B2 * | 6/2006 | Brittan et al. | 704/266 |
| 7,069,213 B2 * | 6/2006 | Thompson | 704/231 |
| 7,069,221 B2 * | 6/2006 | Crane et al. | 704/275 |
| 7,162,421 B1 * | 1/2007 | Zeppenfeld et al. | 704/233 |
| 7,392,188 B2 * | 6/2008 | Junkawitsch et al. | 704/251 |
| 8,000,971 B2 * | 8/2011 | Ljolje | 704/275 |
| 8,046,221 B2 * | 10/2011 | Ljolje | 704/246 |
| 8,185,400 B1 * | 5/2012 | Goffin | G10L 15/22 704/233 |
| 8,306,815 B2 * | 11/2012 | Konig et al. | 704/233 |
| 2002/0184031 A1 | 12/2002 | Brittan et al. | |
| 2003/0083874 A1 * | 5/2003 | Crane | G10L 15/22 704/246 |
| 2003/0158732 A1 * | 8/2003 | Pi | G01S 13/66 704/251 |
| 2004/0098253 A1 * | 5/2004 | Balentine | G10L 15/222 704/215 |
| 2004/0230637 A1 | 11/2004 | Lecoueche et al. | |
| 2005/0027527 A1 * | 2/2005 | Junkawitsch et al. | 704/243 |
| 2005/0055205 A1 * | 3/2005 | Jersak et al. | 704/233 |
| 2005/0080627 A1 * | 4/2005 | Hennebert et al. | 704/270 |
| 2006/0041431 A1 * | 2/2006 | Maes | G10L 15/30 704/270.1 |
| 2006/0136203 A1 * | 6/2006 | Ichikawa | 704/226 |
| 2006/0200345 A1 * | 9/2006 | Kooiman | 704/233 |
| 2008/0004881 A1 | 1/2008 | Attwater et al. | |
| 2008/0294430 A1 * | 11/2008 | Ichikawa | 704/226 |
| 2009/0112599 A1 | 4/2009 | Ljolje | |
| 2009/0254342 A1 * | 10/2009 | Buck et al. | 704/233 |
| 2011/0238417 A1 * | 9/2011 | Yamamoto et al. | 704/233 |

OTHER PUBLICATIONS

Ljolje, A. et al. "Discriminative Training of Multi-State Barge-In Models," *IEEE*, Dec. 1, 2007, pp. 353-358.

Ittycheriah, A., et al. "Detecting User Speech in Barge-In Over Prompts Using Speaker Identification Methods," *Eurospeech'99*, Sep. 5, 1999, pp. 327-330.

Rose, R., et al. "A Hybrid Barge-In Procedure for More Reliable Turn-Taking in Human-Machine Dialog Systems," *IEEE*, Nov. 30, 2003, pp. 198-203.

Setlur, A., et al. "Recognition-Based Word Counting for Reliable Barge-In and Early Endpoint Detection in Continuous Speech Recognition," *5th International Conference on Spoken Language Processing*, Oct. 1, 1998, pp. 168-171.

Office Action dated Jun. 10, 2014 for U.S. Appl. No. 13/515,406, filed Jun. 22, 2012.

European decision to grant dated May 20, 2016 for European application No. 10716929.4; 2 pages.

European Application No. 08 013 196.4 Decision to Grant dated Sep. 4, 2014, 1 page.

European Office Action dated Oct. 16, 2014; for European Pat. App. No. 10 716 929.4; 5 pages.

U.S. Appl. No. 13/518,406 Notice of Allowance dated Mar. 10, 2015, 7 pages.

Office Action dated Nov. 26, 2014; for U.S. Appl. No. 13/518,406; 6 pages.

\* cited by examiner

METHOD FOR DETERMINING THE PRESENCE OF A WANTED SIGNAL COMPONENT

PRIORITY

The present U.S. Patent Application claims priority from European Patent Application No. 08013196.4 entitled Model Based Segmentation with Barge-In Functionality filed on Jul. 22, 2008, which is incorporated herein by reference in its entirety.

TECHNICAL FIELD

Embodiments of the invention are directed to a computer-implemented method and system for determining, in a speech dialogue system issuing speech prompts, a score value as an indicator for the presence of a wanted signal component in an input signal stemming from a microphone.

BACKGROUND

In the last decades, the user-friendliness of voice-controlled systems has been continuously improved. The user shall be enabled to handle complex systems intuitively using speech. The design of the dialogue between men and machine should be adapted to the user to ensure easy handling. Particularly with applications in the field of automobiles, like a voice-controlled hands-free kit, handling has to be easy and must not distract the driver from observing the traffic.

Most systems use an inflexible schema of dialogue, where men and machine are alternating and no temporal overlapping is possible. The system is activated by pressing a handle and the user can make his/her speech input. While the system is playing a message (the "prompt") to the user via a loudspeaker or is inviting his/her input, no interruption (barge-in) by the user is possible.

Such a schema slows down the dialogue, particularly for experienced users, which does not do any good to user-friendliness and, in this way, to the acceptance of voice control. In particular, experienced users commonly wish to be able to go through frequently repeated steps more quickly by being enabled to interrupt the prompt.

Therefore, a speech dialogue system should offer the possibility of a barge-in to the user, i.e. of interrupting the speech prompt by issuing a speech command. A block diagram of a conventional barge-in system is shown in FIG. 4. To communicate with the user, the system issues a prompt signal which, in general, expects some kind of verbal response from the user.

The prompt signal is provided by the prompt unit 460 and is emitted via a loudspeaker 400 as sound into the environment of the system. A microphone 410 is also part of the system, which provides an electrical input signal into the system corresponding to the sum of all the sound which can be received from the environment of the microphone.

At first, the input signal usually passes a unit for noise reduction 420 which removes noise from the input signal according to some standard procedure. In the resulting signal with reduced noise, the segmenting unit 430 identifies the presence of speech in the signal and determines logical units of speech. The segmentation unit 430 also gets information from the prompt unit 460 about which speech prompt is issued to allow taking into account parts of the prompt which are fed back from the loudspeaker 400 to the microphone 410 and thus, are present in the input signal as well.

The segmentation unit 430 signals information concerning the units in the speech to the speech recognition unit 440, which then tries to understand the meaning of the detected units. If a command of the user has been recognized in the input signal by the speech recognition unit 440, it is forwarded to the dialog manager 450 which then decides on further action of the system. This may include issuing another prompt, which may be accomplished by the dialog manager 450 by triggering the prompt unit 460.

However, as the prompt signal and the user's speech signal, which may be the signal wanted by the system, are present simultaneously in the environment of the microphone at least at the beginning of the user' speech, a speech dialogue system has to differentiate between the wanted speech signal issued by the user and the prompt signal. In addition, noise may be received by the microphone which is also interfering with the speech command.

Most barge-in enabled voice systems are based on an evaluation of the received microphone signals and the issued prompt signal which is available to the system. However, no previous knowledge with respect to the differentiation, in barge-in events, between the user's speech and noises in the environment of the microphone is applied with the exception of selecting threshold values. Hence, current systems do not have the possibility to differentiate clearly between utterances of the current speaker and the fed-back prompt as well as noise in the environment of the microphone.

SUMMARY OF THE INVENTION

Embodiments of the present invention include a method which offers a better indicator for the presence of the wanted signal component in the input signal stemming from the microphone. In particular, embodiments provide a method for determining, in a speech dialogue system issuing speech prompts, a score value as an indicator for the presence of a wanted signal component in an input signal stemming from a microphone. A first likelihood function is used to determine a first likelihood value for the presence of the wanted signal component in the input signal. A second likelihood function is used to determine a second likelihood value for the presence of a noise signal component in the input signal. A score value is determined based on the first and the second likelihood values. The first likelihood function is based on a predetermined reference wanted signal, and the second likelihood function is based on a predetermined reference noise signal.

The predetermined reference wanted signal may be generated from at least one wanted signal and at least one speech prompt. To generate the reference wanted signal, at least one wanted signal from at least one human speaker together with at least one prompt may be used. Alternatively, the reference wanted signal may be based on at least one artificial speech signal generated by means of an electronic device, or on a combination of speech of at least one human speaker with at least one artificial signal. The at least one prompt may be taken from the set of available prompts. The signals used to get the reference wanted signal may be combined by adding up, or by averaging, or by forming a weighted sum of the used signals.

At least one signal used to get the predetermined reference wanted signal may be distorted and/or superimposed with interfering noise. Distorted signals and/or signals with superimposed noise may be obtained by artificially superimposing noise and/or by artificial distortion, and/or by recording signals in a noisy environment.

Correspondingly, the predetermined reference noise signal may be generated from at least one noise signal and at least one speech prompt. To generate the reference noise signal, at least one noise signal from a noise source together with at least one prompt may be used. Alternatively, the reference noise signal may be based on at least one artificial noise signal generated by means of an electronic device, or on a combination of at least one noise signal from a noise source with at least one artificial signal. The at least one prompt may be taken from the set of available prompts. The signals used to get the reference noise signal may be combined by adding up, or by averaging, or by forming a weighted sum of the used signals.

At least one signal used to get the predetermined reference noise signal may be distorted and/or superimposed with interfering noise. Distorted signals and/or signals with superimposed noise may be obtained by artificially superimposing noise and/or by artificial distortion, and/or by recording signals in a noisy environment.

Likelihood functions allow the determination of unknown parameters based on known outcomes. In this case, the known outcome is the input signal. Thus, the first likelihood function determines the first likelihood value based on the input signal, and the second likelihood function determines the first likelihood value based on the input signal. The first likelihood value represents a measure for the similarity between the input signal and the predetermined reference wanted signal. The second likelihood value represents a measure for the similarity between the input signal and the predetermined reference noise signal.

The method is adapted to situations where the wanted signal component occurs simultaneously with the speech prompt. By using likelihood functions, the method is based on a statistical model of the wanted signal together with the prompt as well as on a statistical model of interfering noises from the environment together with the prompt. Hence, previous knowledge about the prompt is included into the process of determination of the score value. In addition, expectations with respect to the wanted signal are included in the method as well as expectations with respect to the background noise. Therefore, the wanted signal component is detected more reliably.

By the more reliable detection of the wanted signal, it may be particularly possible to detect start and stop of the wanted signal more clearly. For that reason, the cost of computation of a subsequent step of speech recognition may be considerably reduced, because speech recognition may be activated only in case of a detected wanted signal.

The prompt may be faded out as soon as the presence of the wanted signal is detected reliably. This may happen earlier as the presence of the wanted signal is detected reliably at an earlier time. Thus, the error rate caused by the simultaneous presence of wanted signal and prompt may be reduced. In addition, the user of the system may have to talk concurrently with the prompt only for a very short time.

Determining the likelihood values using functions which are based on a predetermined reference wanted signal permits to predetermine a signal which is similar to the expected wanted signal. In other words, the predetermined reference wanted signal may be similar to the expected wanted signal. In this case, if the wanted signal is the user's speech, then noises generated by the user may not trigger the detection of the wanted signal as they may not be similar to the user's speech and thus lead to low first likelihood values compared to the user's speech. Noises generated by the user may be, for example, coughing, clearing the throat or common breathing noises.

Furthermore, including a predetermined reference noise signal besides the reference wanted signal permits to predetermine types of noise which will be easily recognized as noise and thus will not be mistaken for the wanted signal. Such noises, which may be taken into account in the predetermined reference noise signal, may be the noise of wind. If the system is installed in a car, noise taken into account in the predetermined reference noise signal may be the humming of the engine, hissing of air draft, squeaking of wipers or background speech from the radio or a navigation system The speech prompt may be any kind of signal which is known before the detection of the wanted signal starts. The speech prompt may be a speech signal such as a request or comment issued by the speech dialogue system. The speech prompt may be emitted by a loudspeaker. The speech prompt may be a recorded speech signal which is played to the user. It may also be synthesized by technical means.

The input signal may be obtained by using one microphone or an array of microphones. The wanted signal component may be based on a speech signal. The wanted signal component may be based on a signal tone. A signal tone may be a dial tone as used for dialing by a phone. Particularly, the wanted signal component may be based on the speech signal of a user of the system. Both a wanted signal component and a feedback of the speech prompt may be present in the input signal.

Besides the wanted signal and feedback of the speech prompt, the input signal may comprise a noise signal component corresponding to sound in the environment of the microphone. This environment may be particularly the cabin of a car. So, noise signal components may be based on the engine noise of the car, or may be based on music or speech signals emitted by a radio or other sound emitting device in a car environment, like a mobile telephone or a navigation device.

To obtain the predetermined reference wanted signal, features of a superposition signal comprising one or more model speech prompt signals and one or more model wanted signals may be taken into account. The model signals may be used for a training of the method. A model wanted signal may be one or a combination of a user's speech signals. At least one model speech prompt signal and/or at least one model wanted signal may be distorted and/or superimposed with interfering noise.

Model speech prompt signals used for training may be one, several or all of the speech prompt signals employed in operation of the speech dialogue system. Alternatively, at least one of them may differ from the speech prompts used in operation of the speech prompt system, for example, by using a special training text, voices of different human speakers or at least one voice generated by electronic devices, or modified voices of human speakers. Modifications of a voice may be with respect to emphasis, pitch or speed.

A model wanted signal may be based on the speech signal of a real human speaker, or on a mixture of speech of more than one real human speakers. A model wanted signal may also be based on an artificial signal generated by means of electronic devices, or on a combination of speech of at least one real human speakers with artificial signals.

After the presence of the wanted signal component has been detected based on the score value, the speech prompt may be faded out.

After detection of the presence of the wanted signal, a subsequent step of speech recognition may follow. In this step, the meaning of the speech in the wanted signal may be recognized.

The predetermined reference wanted signal may be based on a first superposition signal obtained by superimposing at least one model wanted signal on at least one model prompt signal, and the predetermined reference noise signal may be based on a second superposition signal obtained by superimposing at least one model noise signal on at least one model prompt signal.

Deriving the predetermined reference wanted signal from a superposition of model wanted signals and model prompt signals offers the possibility to include a variety of prompt signals and of expected wanted signals into the first superposition signal. Correspondingly, a variety of prompts and of expected noise signals may be included into the second superposition signal. Thus, if the combinations of expected signals and prompts included into the first and second superposition signal are similar to the conditions met during operation of the system, the detection rate of the system may be particularly high.

The predetermined reference wanted signal may be obtained from one or more model wanted signals superimposed one on or more model speech prompt signals. Model wanted signals may be based on a user's speech or on artificially generated speech or on dial tones as used by a phone or on other kinds of sound signals.

The predetermined reference noise signal may be obtained from one or more model noise signals superimposed on one or more model speech prompt signals. A model noise signal may be based on real noise, like noise representative for the noise in the cabin of a car. It may be based on synthesized noise, like white noise. It may be based on the emission of a sound reproducing device, like a radio or a navigation system. Or it may be based on a combination of such components. The model noise signal may additionally comprise components of background speech signals, which may be based on speech signals other than the speech prompt or a speech signal from the user of the system.

The first likelihood function may be based on parameters derived from the first superposition signal, and the second likelihood function may be based on parameters derived from the second superposition signal.

The parameters may determine properties of mathematical functions, in particular, of multivariate Gaussian distribution functions.

Using Gaussian functions offers the advantage that the mathematical properties of these functions and their parameters are well known and thus, determining and interpreting of the parameters may be less complicated.

The likelihood functions may be modeled by one or a combination of analytical functions with one or more parameters. The parameters of the analytical functions may be assigned values which are determined by evaluating the likelihood functions with model signals in a period of training.

During a period of training, an optimal set of parameters may be determined for each likelihood function. For the optimal set of parameters for the first likelihood function, the value of the first likelihood function obtained for the predetermined reference wanted signal may be at a maximum. For the optimal set of parameters for the second likelihood function, the value of the second first likelihood function obtained for the predetermined reference noise signal may be at a maximum. In this way, measured signals may be assigned high likelihood values by the likelihood functions if the signals resemble the respective predetermined reference signals.

To determine the optimal set of parameters, a plurality of measurements may be carried out. These measurements may include model wanted signals from a multitude of training users, a variety of model speech prompt signals, and various different model noise signals. The optimal set of parameters may be determined such that the likelihood values are at a maximum for signals superimposed from a plurality of model wanted signals and/or from many model speech prompt signals. Alternatively, the model wanted signal of only one user and/or only one model speech prompt signal may be taken into account for the determination of the optimal set of parameters.

The first likelihood value and the second likelihood value may be determined as a function of a first and a second reference superposition signal, respectively.

Each reference superposition signal may be the average or weighted average of several model reference signals. The superimposed model reference signals may be signals expected in particular situations. The selection of model signals may reflect expectations for the conditions met by the system during operation. The way of superimposing the model signals to form the superposition signals may reflect expectations for the conditions met by the system during operation. Model signals may be model wanted signals and model prompt signals for the first reference superposition signal, and model noise signals and model prompt signals for the second reference superposition signal.

The first likelihood function and/or the second likelihood function may be selected from a plurality of candidate likelihood functions depending on the environment of the microphone.

For that reason, a better adaptation of the speech dialogue system to a particular environment may be achieved.

The candidate likelihood function may be chosen so as to provide a maximum likelihood value if the likelihood value is determined for a corresponding environment of the microphone where the wanted signal has to be identified. Examples may be environments with strong wind noises, with background speech from a radio or third persons, or the humming of an engine. Another possible environment for selecting likelihood functions may comprise speech issued from a particular person or with a particular wording, or where such speech has been issued before or is expected to be issued. Hence, a particular candidate likelihood function may provide a high likelihood value if the likelihood value is determined in an environment which has properties close to the ones expected for the environment.

The first likelihood function or the second likelihood function may be selected from a plurality of candidate likelihood functions depending on a particular user of the speech dialogue system.

For that reason, a better adaptation of the speech dialogue system to a particular user may be achieved.

The candidate likelihood functions may also correspond to signals modeling the characteristics of the speech of a particular user. In this case, a candidate likelihood function may provide a high likelihood value if the likelihood value is determined for a speech signal characterizing the particular user's speech. Individual likelihood functions may be provided, for example, for the owner of the speech dialogue system, or for the owner of a car where the system is installed. Further, likelihood functions may be adapted to male or female voices or to voices of people from different native languages or cultural areas.

The first likelihood function and/or the second likelihood function may be time dependent.

With this feature, the speech dialogue system may be better suited to adapt its properties to periods when a wanted signal is particularly expected.

The likelihood functions and their parameters may be varied with time such that the likelihood values vary with time correspondingly. In this case, the determined score value may be time dependent as well. So, the sensitivity of the system may be varied such that, at times, the system is more sensible for detecting a wanted (e.g. speech) signal component. Such times may be while the system issues longer prompt signals. Such time may also be at periods where experience shows that the user will talk to the speech dialogue system. If the speech dialogue system is installed in a car, the sensitivity for detecting speech may be increased over a time interval after the driver has entered the car, or after the driver has stopped the engine, or generally at times at the beginning and at the end of driving.

By varying parameters of at least one likelihood function over time, the method may be adapted to changing conditions. Such a change in conditions may be a change of the user of the speech dialogue system or a change in the environment of the microphone. If the microphone is operating in a car, the speech dialogue system may be adapted over time to different levels of traffic like in the city or in the country, to changing the volume of a radio in the cabin, to changing weather conditions like wind or rain, or to changing reverberation, which may be caused by moving through a tunnel or opening/closing the windows.

Further, the method may comprise the step of using a third likelihood function to determine a third likelihood value for the presence of a background speech signal component in the input signal; wherein the third likelihood function is based on a predetermined reference background speech signal.

By using the third likelihood function, the speech dialogue system has the possibility to differentiate between a speech command directed to the system, and speech issued in the environment of the microphone, which is not directed to the speech dialogue system. Such speech is called "babble noise".

Background speech signals may be issued by people other than the user of the system, talking to each other or to themselves and/or to the user of the speech dialogue system. Further, a background speech signal may be issued by a radio, a stationary or mobile phone, a navigation system or any other kind of device which emits the sound of music or speech.

The predetermined reference background speech signal may be based on a third superposition signal obtained by superimposing at least one model background speech signal on at least one model prompt signal.

At least one of the signals used to get the predetermined reference background speech signal may be distorted and/or superimposed with interfering noise. Distorted signals and/or signals with superimposed noise may be obtained by artificially superimposing noise and/or by artificial distortion, and/or by recording signals in a noisy environment.

This feature offers the possibility to include model background speech signals into the predetermined reference background signal which correspond to expected speech signals in the environment of the microphone. By using the third likelihood function, it may be possible to more clearly differentiate between wanted signals issued by the user and speech signals which are not the wanted signal.

The third likelihood function may be used to determine if a background speech signal is present at a time when the speech prompt is issued. For that purpose, model background speech signals may be defined. Model background speech signals are supposed to represent that sound of background speech which is typical in an environment where the speech dialogue system may be used. Such an environment may be a car, or an office equipped with devices which can be directed by speech. At least one model background speech signal may be distorted and/or superimposed with interfering noise.

To determine the predetermined reference background speech signal, the signals of one or more model background speech sources, in one or more environments, may be superimposed on a model prompt signal, which may be derived from one, some, or all of the prompt signals issued by the speech dialogue system, or on other speech signals.

The third likelihood function may be modeled by combining mathematical functions like sine, cosine, exponential functions, Gaussian functions or other mathematical functions. Parameters of the third likelihood function may be determined during periods of training. Those parameters may be determined such that the third likelihood value is maximal if the third likelihood value is determined for the predetermined reference background speech signal.

Noise may be reduced in the input signal before determining at least one of the likelihood values.

By reducing noise before the likelihood values are determined, the feature vectors which are used as input for the first likelihood functions may more clearly reflect the properties of the wanted signal. Thus, the first likelihood value obtained from the noise-reduced input signal may be a better indicator for the presence of the wanted signal component.

Reducing noise may include reducing distortions of the input signal. In this case, indication of the wanted signal component may be better detected as well. Reducing noise may be accomplished by using an echo canceller, in particular, by using an adaptive echo canceller. Using an echo canceller permits to remove an estimate of the fed-back prompt signal from the input signal. Canceling of echo signal components may take place before other steps of noise reduction and/or distortion reduction are carried out, or in between, or after such steps. Reducing noise and/or distortions in the input signal may also be used to improve the ability of performing speech recognition in the wanted speech signal component.

Noise may be reduced in the input signal after determining at least one of the likelihood values.

After the likelihood values have been determined, it may be possible to determine the score value and thus determine if a wanted speech signal component is present in the input signal. When noise is reduced after determining at least one of the likelihood values, the determination is, at least in part, based on the input signal with noise and/or distortions. But it may be known after determining at least one of the likelihood values whether a wanted signal component is present. Hence, the subsequent steps of processing (like speech recognition), including noise reduction, may have to be executed only in this case. Thus, computing cost may be saved if noise reduction is carried out only after at least one of the likelihood values has been determined.

The score value may be based on the first likelihood value divided by a sum of the likelihood values.

Determining a score value permits to concentrate the information obtained about the input signal in one value. This value may be the input for further steps of deciding on the presence of the wanted signal.

The sum of likelihood values may be obtained by simply adding the available likelihood values. Summing the likelihood values may also be accomplished by forming a weighted sum of the likelihood values with weighting factors. Weighting factors may be constant or time dependent. Individual weighting factors may also be zero with the consequence that not all of the likelihood values are included in the sum.

The score value may be compared with a threshold value. The threshold value may be a constant value or a value which is time-dependent. The threshold value may be based on the mean or the median of score values. The score values used to determine a threshold value may be compiled over at least one time interval with fixed or variable length and with start and end times which are fixed or variable. In one embodiment, the length of the time interval may be fixed and its start and end time may each have a specified delay with respect to the time when the score value is compared.

Based on comparing the score value with a threshold value, it may be decided if the wanted signal component is present in the input signal. The decision may be dependent on the score value being above or below the threshold value. In addition or alternatively, the difference between the score value and the threshold value may be taken as an indicator for the presence of a wanted signal component. The score value may be evaluated in combination with other indicators. Another indicator may be the time interval from the last time when the wanted signal component has been detected.

The prompt may be faded out as soon as it has been decided that the wanted signal component is present in the input signal.

The invention further provides a computer program product comprising one or more computer readable media having computer-executable instructions thereon for performing the steps of the described method when run on a computer.

The claimed methods as a whole as well as particular steps of them may be executed by a computer.

In addition, the invention provides an apparatus which is adapted to determine, in a speech dialogue system issuing speech prompts, a score value as an indicator for the presence of a wanted signal component in an input signal stemming from a microphone, comprising the components of:

means for determining a first likelihood value for the presence of the wanted signal component in the input signal by using a first likelihood function, means for determining a second likelihood value for the presence of a noise signal component in the input signal by using a second likelihood function, and means for determining a score value based on the first and the second likelihood values, wherein the first likelihood function is based on a predetermined reference wanted signal, and the second likelihood function is based on a predetermined reference noise signal.

BRIEF DESCRIPTION OF THE DRAWINGS

Further aspects of the invention will be described below with reference to the attached figures.

DETAILED DESCRIPTION OF SPECIFIC EMBODIMENTS

Figure 1:
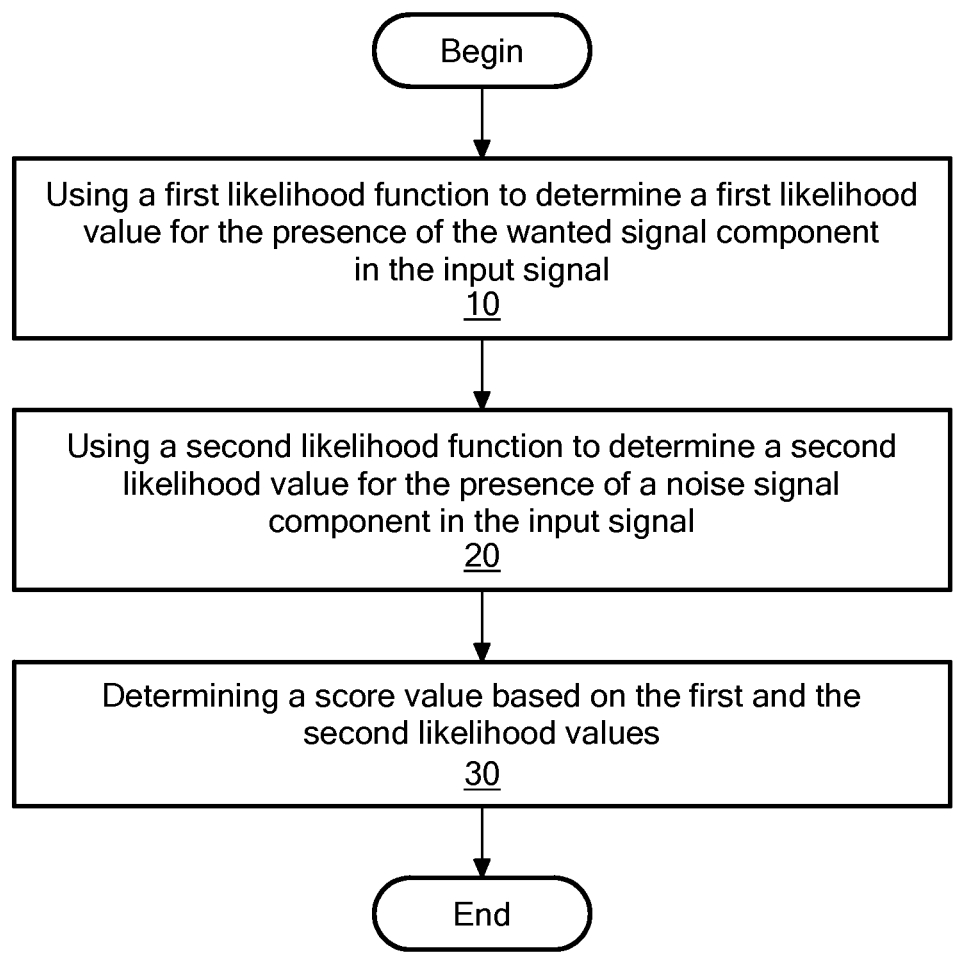
FIG. 1 is a flowchart illustrating a method for determining in a speech dialogue system issuing speech prompts, a score value as an indicator for the presence of a wanted signal component in an input signal stemming from a microphone.

Exemplary embodiments of the invention will be described in the following. There, the operation of the claimed methods will be illustrated for the case that the wanted signal is a speech signal issued by a human person to the speech dialogue system. FIG. 1 shows a flow chart of one embodiment of the present invention for determining, in a speech dialogue system issuing speech prompts, a score value as an indicator for the presence of a wanted signal component in an input signal stemming from a microphone. A first likelihood function is used to determine a first likelihood value for the presence of the wanted signal component in the input signal 10. A second likelihood function is used to determine a second likelihood value for the presence of a noise signal component in the input signal 20. A score value is determined based on the first and the second likelihood values 30. The first likelihood function is based on a predetermined reference wanted signal, and the second likelihood function is based on a predetermined reference noise signal.

An embodiment of the invention is described in connection with FIG. 1A. Besides the loudspeaker 100 and the microphone 110, there is a unit for noise reduction 120, the segmentation unit 130 for detecting the presence of the wanted signal, the speech recognition unit 140, the prompt generation unit 160 and the dialog manager 150. To further describe the environment, FIG. 1 also comprises the sound sources of speech 180 from at least one human speaker and of background noise 190. Additionally, the pulse response 170 of the loudspeaker which may be received by the microphone 110 is illustrated.

The segmentation unit 130 as the first stage of signal processing is used to detect a barge-in situation. In such a situation, the input signal stemming from the microphone 110 comprises a superposition of the wanted signal, e.g. an utterance of the speaker 180, the speech prompt which is fed back to the microphone 110 and background noise 190.

The embodiment makes use of at least two statistical models. In one model which considers barge-in events, a situation is analyzed where the wanted speech signal of the user is superimposed on the speech prompt. A second model considers superpositions of interfering noises from the environment of the microphone with the speech prompt. Previous knowledge about the prompt is included explicitly into the statistic modeling. Both models together are applied to permit a reliable segmentation of the wanted signal component at runtime.

In the following, sound signals are represented by feature vectors. The components of a feature vector are features of the sound signal to be analyzed. Appropriate features to consider may be the energy in the signal, or the Mel Frequency Cepstral Coefficients (MFCC) of the signal, or parameters of the signal derived using Linear Predictive Coding (LPC).

It is assumed that comparable background noises 190 with a characteristic probability distribution of the feature vectors occur, and that the probability distribution of the feature vector of the microphone signal is distorted in a characteristic manner compared to that of the undisturbed signal.

Further, it is assumed that, if a speech input signal 180 from the user is received by the microphone 110, a characteristic change of the probability distribution occurs which differs distinctly form the one caused by background noises 190.

At least two speaker-independent statistical models may be used which are adapted to learn these different characteristics of the two above-mentioned cases in a training phase, and will pass on this previous knowledge to the segmentation unit 130 at runtime. The training may be carried out according to the Estimation Maximization (EM) algorithm. As statistical model, a conditional Gaussian Mixture Model (shortly GMM) is used because it exploits the input signal stemming from the microphone 110 as well as the issued speech prompt signal.

The feature vector, which is derived from acoustic pre-processing of the received input signal stemming from the microphone 110, is subsequently denoted as x. The statistical concepts used for obtaining the models are described in the following.

Multivariate Gaussian Mixture Models consist of a weighted sum of N single Gaussian distributions. Each individual Gaussian distribution $N_i\{x|\mu_i,\Sigma_i\}$ with index i is completely described by its mean $\mu_i$ and its covariance matrix $\Sigma_i$. In this connection, the covariance matrix is frequently assumed to be diagonal. By weighting the individual Gaussian distributions with the corresponding discrete a priori probabilities $w_i$ with the property $\Sigma_i^N w_i=1$, the probability density of the GMM is obtained. The model is completely described by the set of parameters $\lambda=\{w_1,K,w_N,\mu_1,K,\mu_N,\Sigma_1,K,\Sigma_N\}$.

$$p(x|\lambda) = \sum_i^N w_i \cdot N_i\{x|\mu_i,\Sigma_i\} \quad (1)$$

To obtain a set of parameters $\lambda$ which describes the probability distribution of the components of the feature vector x of a sound signal properly, the phase of training is used with the goal of determining $\lambda$ such that the observed distribution of the features is approximated in an optimal way by the likelihood function $p(x|\lambda)$ of the model. Starting from an initial set $\lambda_0$, $p(x|\lambda)$ is estimated and maximized during the training through several iterations until it reaches a maximum The above-mentioned GMMs represent an a priori probability distribution by superposition of single Gaussian distributions. It can be shown in general (Bishop: "*Pattern Recognition and Machine Learning*", Springer, Berlin 2006), that, by a transformation of the Gaussian function, an a posteriori probability density can be obtained. This can be interpreted as follows.

By splitting a feature vector z into a portion with the multivariate random variable x and an observed Vector y, whose a priori probability distribution may be selected arbitrarily and is irrelevant for the further discussion, z can be represented like this:

$$z = \begin{pmatrix} x \\ y \end{pmatrix} \quad (2)$$

Starting with a Gaussian distribution of z, a conditional Gaussian distribution for x|y can be derived in a mathematically exact way. x|y represents the random variable x with knowledge of y. In the following, the subscripted index z or x|y is used to clarify whether z or x|y is further described.

$$p(z)=N_z\{z|\mu_z,\Sigma_z\} \quad (3)$$

$$p(x|y)=N_{x|y}\{x|y,\mu_{x|y},\Sigma_{x|y}\} \quad (4)$$

The time-variant conditional mean $\mu_{x|y}$ is, in turn, directly dependent on the means $\mu_x=E\{x\}$ and $\mu_y=E\{y\}$ and on the current feature vector y. Furthermore, the statistical dependencies between x and y affect the conditional mean as well.

$$\mu_{x|y}=\mu_x+C \cdot [y-\mu_y] \quad (5)$$

$$C=\Sigma_{xy} \cdot \Sigma_{yy}^{-1} \quad (6)$$

C represents the Wiener weighting factor which, in most cases, may be replaced by a unity matrix for the purpose of simplification.

$$C=I \quad (7)$$

The notation $N_{x|y}\{x|y,\mu_{x|y},\Sigma_{x|y}\}$ instead of $N_{x|y}\{x|\mu_{x|y},\Sigma_{x|y}\}$ has been chosen to differentiate between the conditional Gaussian distribution and the simple Gaussian distribution, even if the observed vector y is already comprised in $\mu_{x|y}$.

The conditional covariance matrix $\Sigma_{x|y}$ can be computed from the covariance matrices of x and y. Of importance is in this case, that, unlike the conditional mean, the conditional covariance matrix is time-invariant, because it is not dependent on the current measured value y. Therefore, it can be determined once during the training phase and can be loaded from memory at runtime.

$$\Sigma_{x|y}=\Sigma_{xx}+\Sigma_{xy}(\Sigma_{yy})^{-1}(\Sigma_{xy})^T \quad (8)$$

By combining the conditional Gaussian distributions and the GMMs as described above, and by introducing a latent variable i for the i-th individual conditional Gaussian distribution, a conditional GMM is obtained.

Unlike the normal GMM (1), the conditional GMM consists of a superposition of conditional Gaussian distributions and represents a conditional probability distribution. $\tilde{w}_i$ again identifies the weighting factor of the individual distributions.

$$p(x|y,\lambda) = \sum_{i=1}^N \tilde{w}_i \cdot N_{x|y,i}\{x|y,\mu_{x|y,i},\Sigma_{x|y,i}\} \quad (9)$$

$$p(x|y,\lambda) = \sum_{i=1}^N \tilde{w}_i \cdot p(x|y,i,\lambda) \quad (10)$$

The conditional GMM is completely described by the set of parameters $\lambda=\{\tilde{w}_1,K,\tilde{w}_N,\mu_{x,1},K,\mu_{x,N},\mu_{y,1},K,\mu_{y,N},C_1K,C_N,\Sigma_{x|y,1},K,\Sigma_{x|y,N}\}$.

Two conditional GMMs are now introduced for the two considered cases of wanted speech signal of the user superimposed on the speech prompt and interfering noises from the environment of the microphone superimposed on the speech prompt. These two conditional GMMs are the basis for the first and the second likelihood function, which are dependent on a feature vector x which is obtained from the input signal stemming from a microphone 110. with knowledge of a feature vector of the issued prompt signal y.

The two respective models are described by the set of parameters $\lambda_{speaker}$ and $\lambda_{background}$, respectively, which are determined in the training phase. One model corresponding to $\lambda_{speaker}$ captures the characteristics of speech input of a user 180 during prompt output. The other model corresponding to $\lambda_{background}$ represents the superposition of the prompt signal with a noise signal component 190. For the training of these models, a set of stereo data may be required which comprises, for a plurality of speakers, the feature vectors of the speaker x as well as the corresponding feature vectors of the issued speech prompt y.

$$p(x \mid y, \lambda_{speaker}) = \sum_{i=1}^{N} \tilde{w}_i \cdot N_{x|y,i}\{x \mid y, \tilde{\mu}_{x|y,i}, \tilde{\Sigma}_{x|y,i}\} \quad (11)$$

$$p(x \mid y, \lambda_{background}) = \sum_{i=1}^{N} \acute{w}_i \cdot N_{x|y,i}\{x \mid y, \acute{\mu}_{x|y,i}, \acute{\Sigma}_{x|y,i}\} \quad (12)$$

The likelihood function $p(x|y, \lambda_{speaker})$, corresponding to the first model, provides a likelihood value for the presence of a user's speech signal 180 in the input signal stemming from the microphone 110 besides the fed-back prompt 170, based on the similarity of the actual speech signal with superimposed prompt to one or more model speech signals (being models of the wanted signal) superimposed on one or more model prompt signals, where the model signals have been used in the training phase of the system. The likelihood function $p(x|y, \lambda_{background})$, corresponding to the second model, provides a likelihood value for the presence of a noise signal component 190 in the input signal stemming from the microphone 110 besides the fed-back prompt 170, based on the similarity of the noise signal with superimposed prompt to one or more model noise signals superimposed on one or more model prompt signals, where the model signals have been used in the training phase of the system.

By adequate normalization or weighting of the likelihood functions for the two models, a real-time enabled detection with respect to the user in the foreground and vocal as well as non-vocal interference sources in the background is achieved. A score value S as an indicator for the presence of the (wanted) user's speech signal component in the input signal in question may be determined like follows:

$$S = \frac{p(x \mid y, \lambda_{speaker})}{p(x \mid y, \lambda_{speaker}) + p(x \mid y, \lambda_{background})} \quad (13)$$

In another embodiment, the presented concept may be complemented by a further component. So far, it can only be determined whether a barge-in event by a speaker has occurred. By complementing the two statistical models (11) and (12) by at least one additional model, it may be differentiated whether the barge-in has been triggered by a speaker in the foreground, presumably the current user, or by one or more interfering speakers in the environment.

For that purpose, an additional conditional GMM may be trained to be adapted to a plurality of interfering speakers and various superpositions of background speakers, as may be caused by speakers in the environment of the microphone 110, together with the speech prompt signal. Such kind of additional speech signals caused by speakers in the environment of the microphone 110 which are not intended for the speech dialogue system, are called "babble noise".

In this way, at least one additional model for the case of a background speech signal besides the prompt signal may be obtained.

$$p(x \mid y, \lambda_{babble\ noise}) = \sum_{i=1}^{N} \overline{w}_i \cdot N_{x|y,i}\{x \mid y, \overline{\mu}_{x|y,i}, \overline{\Sigma}_{x|y,i}\} \quad (14)$$

The model is described by the set of parameters $\lambda_{babble\ noise}$ obtained by training. The likelihood function $p(x|y, \lambda_{babble\ noise})$ corresponding to the third model, provides a likelihood value for the presence of a signal component from background speakers in the input signal stemming from the microphone 110 besides the fed-back prompt 170, based on the similarity of the input signal in question to one or more model babble noise signals superimposed on one or more model prompt signals used in the training phase of the system.

In this case, the score value S indicating the presence of the user's speech input may have the following form.

$$S = \frac{p(x \mid y, \lambda_{speaker})}{p(x \mid y, \lambda_{speaker}) + p(x \mid y, \lambda_{background}) + p(x \mid y, \lambda_{babble\ noise})} \quad (15)$$

In further embodiments, the score value S may be subject to subsequent processing. Alternatively, a simple threshold discriminator may be used for the final decision on the presence of the wanted signal component, in particular, of the user's speech signal, in the input signal.

In yet other embodiments, all the parameters and threshold values of the method may be controlled such that they are time-variant.

Figure 2:
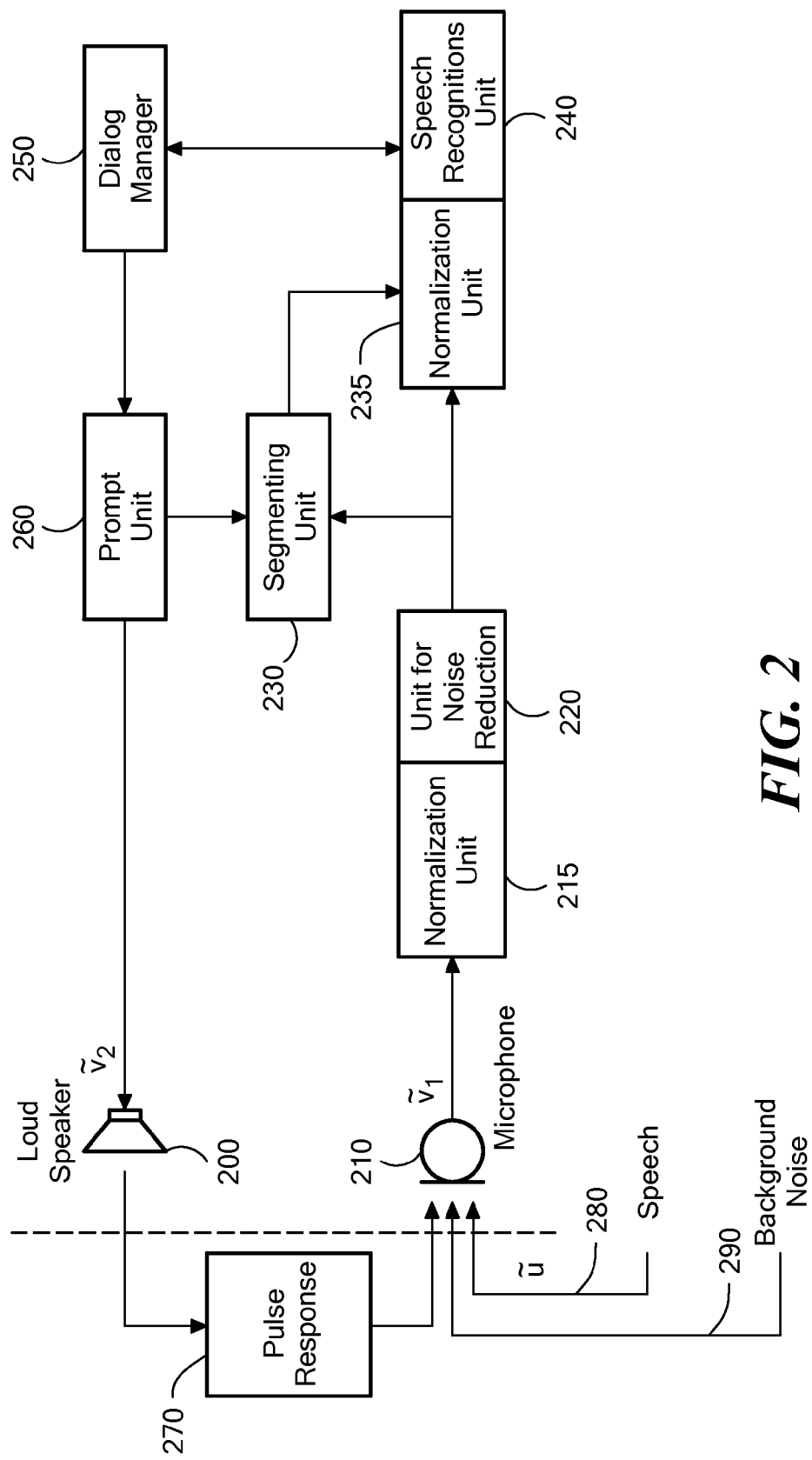
FIG. 2 illustrates an example of applying normalization of the feature vectors derived from the input signal to the speech dialogue system.

In a further exemplary embodiment depicted in FIG. 2, the methods as introduced above may be complemented by additional signal processing. To reduce the effects of the superposition of the wanted signal and the prompt signal to the feature vectors, a model-based normalization corresponding to the SPLICE process (Droppo, Deng, Acero: "*Evaluation of the SPLICE Algorithm on the AURORA2 Database*", Proc. Eurospeech, pp. 217220, 2001) may be applied to the feature vector of the input signal stemming from the microphone 110.

Starting with a set of data which comprises the feature vectors x of undisturbed utterances as well as the corresponding disturbed feature vectors y of the same utterances, a back-transformation is obtained by training which is leading from the disturbed to the undisturbed feature vectors so as to arrive at an estimated value $\hat{x}$ for x. The interference in y is made up of an additive component in the time-based signal representation of the received signal like, for example, background noises.

This process aims at learning the statistical dependencies between disturbed and undisturbed feature vectors in a training procedure to replace, at runtime, the disturbed feature vectors y by an estimate $\hat{x}$ for the corresponding undisturbed feature vectors x. As criterion for the estimation, the Minimum Mean Square Error (MMSE) criterion may be used As the optimal MMSE estimation averages the conditional probability density $p(x|y)$, a conditional GMM is used for modeling.

$$\hat{x} = E\{x \mid y\} \quad (16)$$

$$= \int_x x \cdot p(x \mid y) dx \quad (17)$$

$$= \int_x x \cdot \sum_i p(x, i \mid y) dx \quad (18)$$

$$= \int_x x \cdot \sum_i p(x \mid y, i) \cdot p(i \mid y) dx \quad (19)$$

$$= \sum_i p(i \mid y) \cdot E\{x \mid y, i\} \quad (20)$$

Here, only the linearity of the expectation value and the sum as well as the Bayes theorem have been applied. Furthermore, a latent variable i for the i-th individual Gaussian distribution has been introduced. In combination with (10), it is apparent that the MMSE estimate can be realized by a conditional GMM with the consequence that $$E\{x \mid y, i\} = E\{N_{x \mid y, i}\{x \mid y, \mu_{x \mid y, i}, \Sigma_{x \mid y, i}\}\}. \quad (21)$$

As the expectation value $E\{x \mid y, i\}$ of a Gaussian distribution is equal to its vector of means, the following expression for the estimate $\hat{x}$ is obtained from (20) and (21) for a conditional GMM in combination with the assumption in equation (7). Here, the EM algorithm may be used for training as well.

$$\hat{x} = y + \sum_i^N p(i \mid y) \cdot (\mu_{x,i} - \mu_{y,i}) \quad (22)$$

$$\hat{x} = y + \sum_i^N p(i \mid y) \cdot r_i \quad (23)$$

Thus, each individual distribution i in the conditional GMM causes a correction of the disturbed vector by a shift in the feature space which is meant to compensate the interference. However, the mapping of the disturbed vector to the respective individual distribution via the corresponding discrete a posteriori probability p(i|y) has to be determined. As the conditional GMM models the distribution of the random variable x under knowledge of y while the variable x is not available at runtime, the a posteriori probability of the conditional GMM can not be used for the mapping. To get around this problem, a further GMM is employed which reflects the distribution of the disturbed feature vectors and is the starting point for calculating the attribution p(i|y).

$$p(y) = \sum_i^N w_i \cdot N_i\{y \mid \mu_{y,i}, \Sigma_{y,i}\} \quad (24)$$

The quantities $w_i$ and $\mu_{y,i}$ are extracted directly from the training of the conditional GMM.

Considering the term for the i-th distribution, the a posteriori probability p(i|y) is obtained as follows.

$$p(i \mid y) = \frac{w_i \cdot N_i\{y \mid \mu_{y,i}, \Sigma_{y,i}\}}{\sum_i^N w_i \cdot N_i\{y \mid \mu_{y,i}, \Sigma_{y,i}\}} \quad (25)$$

FIG. 2 illustrates an exemplary system employing model-based normalization. Most constituents of the system are identical to those in FIG. 1A. While normalization units 215, and 235 have been added, FIG. 2 shows the prompt unit 260, the loudspeaker 200, the microphone 210, the unit for noise reduction 220, the segmenting unit 230, the speech recognition unit 240, the dialog manager 250 and also comprises the sound sources of at least one human speaker 280, of background noise 290 as well as the pulse response 270 of the loudspeaker at the microphone.

Two approaches to normalization may be chosen. The normalization of the feature vectors may be employed before or after the wanted signal has been detected by the segmentation unit 230.

If the normalization unit 215 is employed before detecting the wanted signal by the segmentation unit 230, and thus, before the speech recognition unit 240 has started to work, both steps of processing benefit from the correction of the feature vectors, whereby an improvement of the detection of the wanted signal and the recognition rate can be achieved.

If the normalization unit 235 is employed after detecting the wanted signal by the segmentation unit 230, computing cost can be reduced considerably, as this step of processing is passed only in the case of a barge-in event.

In the model used for normalization of the feature vectors of the microphone signal, the feature vector of the user's speech signal is denoted as $\tilde{u}$ and the disturbed feature of the microphone signal is denoted as $\tilde{v}$. $\tilde{v}$ may comprise components of the user's speech 280, the fed-back prompt output 270 and background noise 290, together forming the component $\tilde{v}_1$, and the output prompt, forming component $\tilde{v}_2$ To compute the feature vector $\tilde{v}$, the following possibilities for variations may be considered:

$$\tilde{v} = \begin{pmatrix} \tilde{v}_1 \\ \tilde{v}_2 \end{pmatrix}$$

$$\tilde{v} = \tilde{v}_1$$

In FIG. 2, $\tilde{u}$ identifies the feature vector for undisturbed speech of the user as a wanted signal and $\tilde{v}$ identifies the feature vector comprising the observed disturbed signals.

The models presented in this context represent independent statistical models which do not have to be identical to the models for detecting the wanted signal component, which have been described before.

A conditional GMM may be trained, which realizes the correction from disturbed to undisturbed feature vectors. Furthermore, a GMM may be extracted from this conditional GMM which realizes the mapping $p(i \mid \tilde{v})$ between the disturbed vector $\tilde{v}$ and the individual distributions in the conditional GMM.

As an enhancement, the MEMLIN process may be applied (Buera, Lleida, Miguel, Ortega, Saz: "*Cepstral Vector Normalization based on Stereo Data for Robust Speech Recognition*", IEEE Transactions on Audio, Speech and Language Processing, 2007), which uses the distribution of the disturbed as well as of the undisturbed features for the mapping according to (25).

In further embodiments, all threshold values and parameters of the presented method may be defined time-variant to provide systems which are dependent or independent on the barge-in statistics and may adjust the determination or processing of the score value to indicate the presence of a wanted signal at times or at dialogue steps with frequent barge-in such that the system is more sensible to detecting the wanted signal component. This is particularly true for threshold values used in the process of deciding on the presence of the wanted signal component, e.g., by comparing a threshold value with the score value.

In most applications, only a limited number of commands are allowed at a particular dialogue step. Only those allowed commands represent valid barge-in events. Their probability distribution in feature space may differ significantly.

In embodiments mentioned before, for each of the set of parameters $\lambda_{Speaker}$, $\lambda_{Background}$ and $\lambda_{Babble\ Noise}$, the same set of parameter values is used for all dialogue steps. However, for different barge-in situations, different sets of parameter values may be determined by training for at least one of the sets of parameters in other exemplary embodiments. This has the consequence that individual, specialized sets of parameter values may be provided for groups of dialogue steps or even for individual dialogue steps.

Separate sets of parameter values may also be established for differing acoustic environments or according to other criteria in corresponding exemplary embodiments.

By employing echo cancelling in further exemplary embodiments, the prompt signal in the input signal stemming from the microphone can be compensated by estimating the feed-back of the prompt to the input signal.

Figure 1A:
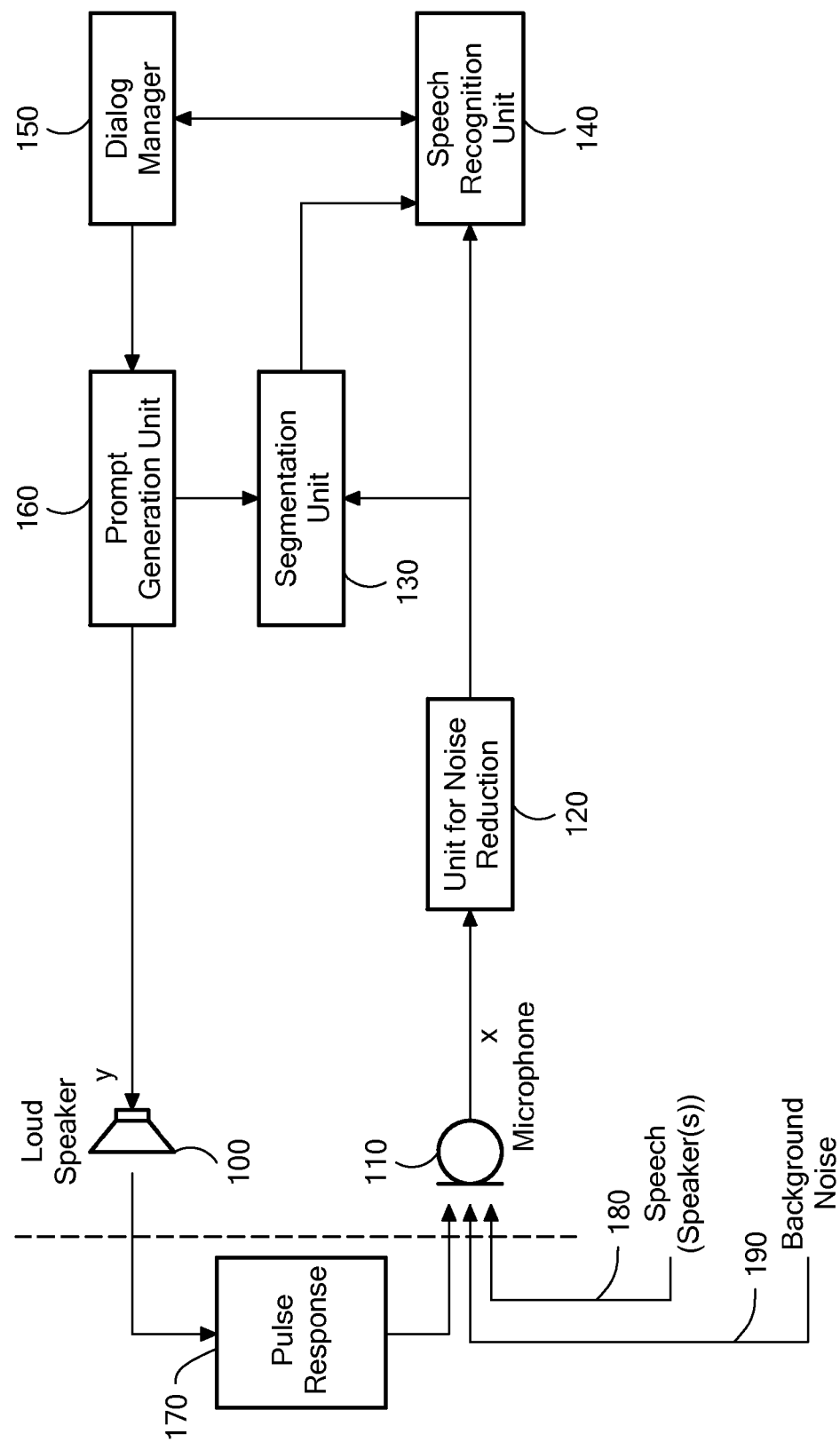
FIG. 1A illustrates an example of modelling an input signal x with known prompt signal y in a speech-dialogue system.
Figure 3:
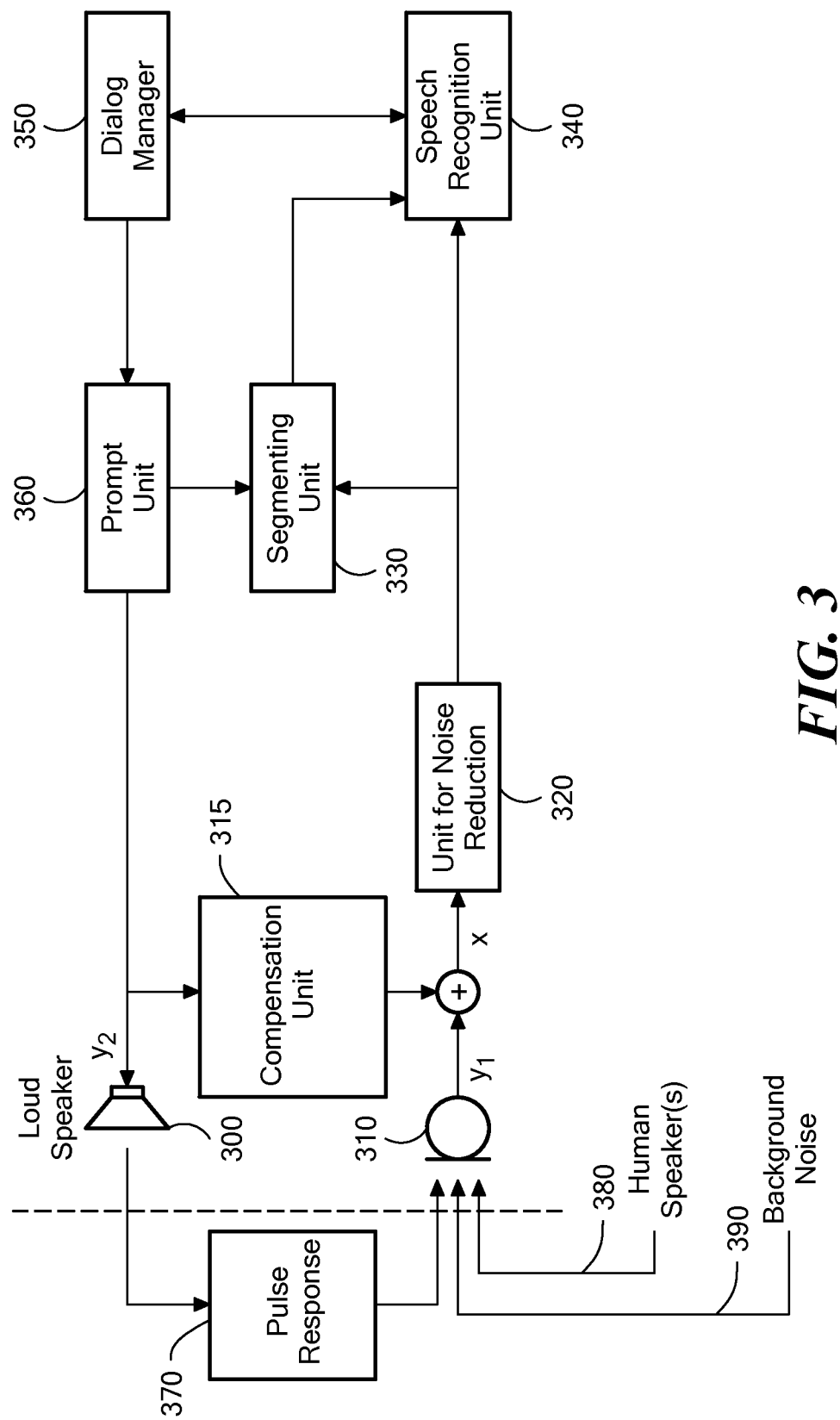
FIG. 3 illustrates an exemplary modeling of the user's speech signal x with a measured input signal after echo cancelling $y_1$ and with known prompt signal $y_2$.
Figure 4:
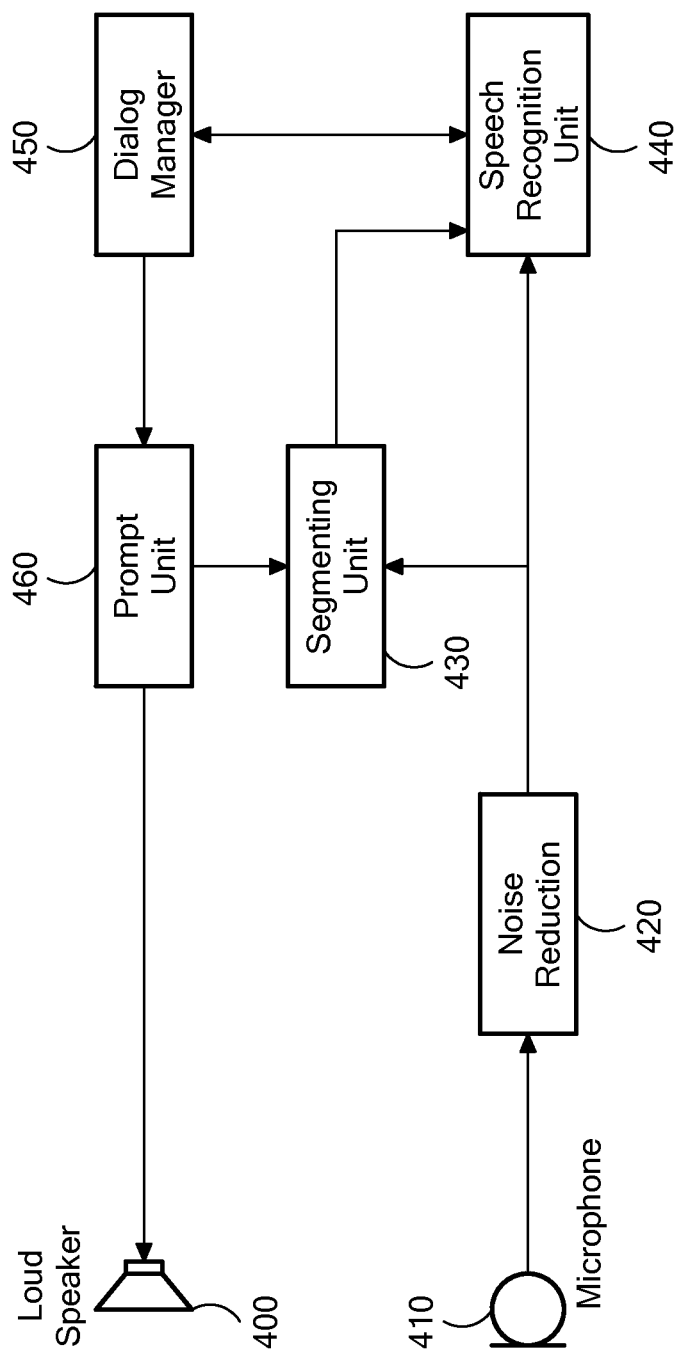
FIG. 4 presents a block diagram of an exemplary prior art speech-dialogue system with prompt output and a receiving microphone.

A combination of the method illustrated by FIG. 1 and FIG. 1A with other methods like echo cancelling (compare Ittycheriah, Mammone: "*Detecting User Speech in Barge-In Over Prompts Using Speaker Identification Methods*", EUROSPEECH '99, pp. 327-330, 1999) may be advantageous for modeling. FIG. 3 illustrates an exemplary system using echo cancelling. There, the feedback of the prompt signal to the microphone is estimated using an echo compensation unit 315 such that, with ideal adjustment of the compensation unit 315, the prompt signal is removed from the input signal stemming from the microphone. The other constituents of the system shown in FIG. 3 correspond to those of FIG. 1, i.e. FIG. 1 shows the prompt unit 360, the loudspeaker 300, the microphone 310, the unit for noise reduction 320, the segmenting unit 330, the speech recognition unit 340, the dialog manager 350 and also comprises the sound sources of at least one human speaker 380, of background noise 390 as well as the pulse response 370 of the loudspeaker at the microphone.

The corresponding conditional GMM to be used for identifying the wanted signal represents the probability distribution of the feature vectors of the microphone signal after echo cancelling x with knowledge of the feature vectors of the received signal $y_1$ and/or of the outputted prompt signal $y_2$ as illustrated in FIG. 3.

To compute the feature vector y, the following variations may be considered in exemplary embodiments:

$$y = \begin{pmatrix} y_1 \\ y_2 \end{pmatrix}$$

$$y = y_1$$

$$y = y_2$$

Modeling and detection of the wanted signal component are otherwise as described above.

Depending on the application, the above-mentioned models may be trained specifically for one individual speaker or for particular groups of speakers with characteristic features, like male/female speakers, or for other types of received sound in further exemplary embodiments.

Further examples of embodiments of the invention may include the following features.

In exemplary embodiments, the parameters of one or more likelihood functions may vary in time. Hence, the likelihood functions may be adapted to varying environmental conditions.

Embodiments may follow the approach of employing simple GMMs. In contrast to the embodiments described before, the simple GMMs do not have any previous knowledge of the prompt signal component in the input signal. In this case, the cost of training or the computing power required to calculate the likelihood at runtime may be reduced.

Additionally, these exemplary embodiments may include normalization of feature vectors and/or subsequent processing of the score value as described above. In particular, normalization may be applied to the feature vector of the microphone signal as described above.

All other enhancements mentioned before may be applied in the case of exemplary embodiments employing simple GMMs as well.

It is to be understood that different parts and components of the method and apparatus described above can also be implemented independent of each other and be combined in different form. Furthermore, the above described embodiments are to be construed as exemplary embodiments only.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The invention claimed is:

1. A method for determining, in a speech dialogue system issuing speech prompts, a score value as an indicator for the presence of a wanted signal component in an input signal stemming from a microphone, comprising the steps of:
   using a first likelihood function to determine a first likelihood value for the presence of the wanted signal component in the input signal,
   using a second likelihood function to determine a second likelihood value for the presence of a noise signal component in the input signal, and
   determining, using a processor, a score value based on the first and the second likelihood values, wherein the first likelihood function is based on a predetermined reference wanted signal, and the second likelihood function is based on a predetermined reference noise signal,
   wherein the redetermined reference wanted signal is based on a first superposition signal obtained by superimposing at least one model wanted signal on at least one model prompt signal, and the predetermined reference noise signal is based on a second superposition signal obtained by superimposing at least one model noise signal on the at least one model prompt signal.

2. The method of claim 1, wherein the first likelihood function is based on parameters derived from the first superposition signal, and the second likelihood function is based on parameters derived from the second superposition signal.

3. The method of claim 2, wherein the parameters determine properties of mathematical functions, in particular, of multivariate Gaussian distribution functions.

4. The method according to claim 1, wherein the first likelihood value and the second likelihood value are determined as a function of a first and a second reference superposition signal, respectively.

5. The method according to claim 1, further comprising the step of selecting the first likelihood function and/or the second likelihood function from a plurality of candidate likelihood functions depending on the environment of the microphone.

6. The method according to claim 1, further comprising the step of selecting the first likelihood function or the second likelihood function from a plurality of candidate likelihood functions depending on a particular user of the speech dialogue system.

7. The method according to claim 1, wherein the first likelihood function and/or the second likelihood function are time dependent.

8. The method of according to claim 1, further comprising the step of:
   using a third likelihood function to determine a third likelihood value for the presence of a background speech signal component in the input signal; wherein the third likelihood function is based on a predetermined reference background speech signal.

9. The method of claim 8, wherein the predetermined reference background speech signal is based on a third superposition signal obtained by superimposing at least one model background speech signal on at least one model prompt signal.

10. The method according to claim 1, further comprising reducing noise in the input signal before determining at least one of the likelihood values.

11. The method according to claim 1, further comprising reducing noise in the input signal after determining at least one of the likelihood values.

12. The method according to claim 1, wherein the score value is based on the first likelihood value divided by a sum of the likelihood values.

13. The method according to claim 1, further comprising the step of:
   comparing the score value with a threshold value.

14. The method of claim 1, further including transforming the wanted signal component from a user speech command to a system instruction.

15. A computer program product comprising one or more non-transitory computer readable media having computer code stored thereon for producing a score value as an indicator for the presence of a wanted signal component in an input signal stemming from a microphone, the computer code comprising:
   computer code using a first likelihood function to determine a first likelihood value for the presence of the wanted signal component in the input signal,
   computer code using a second likelihood function to determine a second likelihood value for the presence of a noise signal component in the input signal, and
   computer code for determining a score value based on the first and the second likelihood values, wherein the first likelihood function is based on a predetermined reference wanted signal, and the second likelihood function is based on a predetermined reference noise signal,
   wherein the predetermined reference wanted signal is based on a first superposition signal obtained by superimposing at least one model wanted signal on at least one model prompt signal, and the predetermined reference noise signal is based on a second superposition signal obtained by superimposing at least one model noise signal on the at least one model prompt signal.

16. The computer program product of claim 15, wherein the first likelihood function is based on parameters derived from the first superposition signal, and the second likelihood function is based on parameters derived from the second superposition signal.

17. The computer program product of claim 16, wherein the parameters determine properties of mathematical functions, in particular, of multivariate Gaussian distribution functions.

18. The computer program product according to claim 15, wherein the first likelihood value and the second likelihood value are determined as a function of a first and a second reference superposition signal, respectively.

19. The computer program product according to claim 15, further comprising:
computer code for selecting the first likelihood function and/or the second likelihood function from a plurality of candidate likelihood functions depending on the environment of the microphone.

20. The computer program product according to claim 15, further comprising:
computer code for selecting the first likelihood function or the second likelihood function from a plurality of candidate likelihood functions depending on a particular user of the speech dialogue system.

21. The computer program product according to claim 15, wherein the first likelihood function and/or the second likelihood function are time dependent.

22. The computer program product of according to claim 15, further comprising:
computer code for using a third likelihood function to determine a third likelihood value for the presence of a background speech signal component in the input signal; wherein the third likelihood function is based on a predetermined reference background speech signal.

23. The computer program product of claim 22, wherein the predetermined reference background speech signal is based on a third superposition signal obtained by superimposing at least one model background speech signal on at least one model prompt signal.

24. The computer program product according to claim 15, further comprising:
computer code for reducing noise in the input signal before determining at least one of the likelihood values.

25. The computer program product according to claim 15, further comprising:
computer code for reducing noise in the input signal after determining at least one of the likelihood values.

26. The computer program product according to claim 15, wherein the score value is based on the first likelihood value divided by a sum of the likelihood values.

27. The computer program product according to claim 15, further comprising:
computer code for comparing the score value with a threshold value.

28. An apparatus which is adapted to determine, in a speech dialogue system issuing speech prompts, a score value as an indicator for the presence of a wanted signal component in an input signal stemming from a microphone, comprising the components of:
means for determining a first likelihood value for the presence of the wanted signal component in the input signal by using a first likelihood function,
means for determining a second likelihood value for the presence of a noise signal component in the input signal by using a second likelihood function, and
means for determining a score value based on the first and the second likelihood values, wherein the first likelihood function is based on a predetermined reference wanted signal, and the second likelihood function is based on a predetermined reference noise signal,
wherein the predetermined reference wanted signal is based on a first superposition signal obtained by superimposing at least one model wanted signal on at least one model prompt signal, and the predetermined reference noise signal is based on a second superposition signal obtained by superimposing at least one model noise signal on the at least one model prompt signal.

* * * * *